(12) United States Patent
Chong et al.

(10) Patent No.: US 10,569,664 B2
(45) Date of Patent: *Feb. 25, 2020

(54) METHODS AND SYSTEMS FOR MANAGING POWER SUPPLY AT A DEVICE

(71) Applicant: Pismo Labs Technology Limited, Kowloon (HK)

(72) Inventors: Ming Pui Chong, Hong Kong (HK); Kin Kwong Chow, Hong Kong (HK)

(73) Assignee: PISMO LABS TECHNOLOGY LIMITED, Kowloon (HK)

(*) Notice: Subject to any disclaimer, the term of this patent is extended or adjusted under 35 U.S.C. 154(b) by 0 days.

This patent is subject to a terminal disclaimer.

(21) Appl. No.: 16/241,917

(22) Filed: Jan. 7, 2019

(65) Prior Publication Data

US 2019/0160970 A1 May 30, 2019

Related U.S. Application Data

(63) Continuation of application No. 14/421,141, filed as application No. PCT/IB2014/064921 on Sep. 29, 2014, now Pat. No. 10,173,535.

(51) Int. Cl.
| | | |
|---|---|---|
| *H02J 1/10* | (2006.01) | |
| *H02J 9/06* | (2006.01) | |
| *B60R 16/033* | (2006.01) | |
| *B60R 16/037* | (2006.01) | |
| *B60L 53/14* | (2019.01) | |
| *B60L 50/50* | (2019.01) | |

(52) U.S. Cl.
CPC ............ *B60L 53/14* (2019.02); *B60L 50/50* (2019.02); *B60R 16/033* (2013.01); *B60R 16/037* (2013.01); *H02J 1/10* (2013.01); *H02J 9/06* (2013.01)

(58) Field of Classification Search
CPC .... H02J 9/061; H02J 9/062; H02J 9/06; H02J 1/00; H02J 1/10; H02J 1/14; B60L 11/12;
(Continued)

(56) References Cited

U.S. PATENT DOCUMENTS 5,315,161 A * 5/1994 Robinson .................. G06F 1/30
307/66
6,528,899 B1 * 3/2003 Saito ........................ H02J 1/14
307/10.1
(Continued)

FOREIGN PATENT DOCUMENTS

| CN | 101674025 A | 3/2010 |
|---|---|---|
| CN | 102211553 A | 10/2011 |

(Continued)

OTHER PUBLICATIONS

International Search Report in International Application No. PCT/IB2014/064921, dated Jun. 26, 2015.
(Continued)

*Primary Examiner* — Lincoln D Donovan
*Assistant Examiner* — Diana J. Cheng
(74) *Attorney, Agent, or Firm* — Hershkovitz & Associates, PLLC; Abe Hershkovitz

(57) ABSTRACT

Methods and systems for managing power supply at a device. The device is capable of receiving power via a plurality of power inputs. The device first determines whether a first condition is satisfied. A first switch is maintained in a closed position if the first condition is satisfied. When the first switch is in a closed position, the device is capable of receiving power from a first power supply. Alternatively, when the first condition is not satisfied, the device determines whether or not a second condition is satisfied. If the second condition is satisfied, the first switch is maintained to be in a closed position. If the second condition is not satisfied, the first switch is opened after a predefined time period.

20 Claims, 10 Drawing Sheets

(58) Field of Classification Search
CPC ....... B60L 11/18; B60R 16/033; B60R 16/02; B60R 16/03
See application file for complete search history.

(56) References Cited

U.S. PATENT DOCUMENTS

| | | | |
|---|---|---|---|
| 9,356,637 B2* | 5/2016 | Taya | .......................... H02J 1/10 |
| 2012/0199172 A1 | 8/2012 | Avrutsky | |

FOREIGN PATENT DOCUMENTS

| | | | |
|---|---|---|---|
| CN | 202172287 U | 3/2012 | |
| CN | 203251099 U | 10/2013 | |
| EP | 1014529 A2 | 6/2000 | |
| JP | 2010284037 A | 12/2010 | |

OTHER PUBLICATIONS

Written Opinion of the International Searching Authority in International Application No. PCT/IB2014/064921, dated Jun. 26, 2015.
International Preliminary Report on Patentability Chapter I of International Application No. PCT/IB2014/064921, dated Apr. 4, 2017.
Search Report in Chinese Patent Application No. 201480081363.0, dated Aug. 7, 2018.
Office Action in Chinese Patent Application No. 201480081363.0, dated Aug. 29, 2018.
English language Abstract of CN202172287U (Mar. 21, 2012).
English language Abstract of CN102211553A (Oct. 12, 2011).
English language Abstract of CN101674025A (Mar. 17, 2010).
English language Abstract of CN203251099U (Oct. 23, 2013).
English language Abstract of JP2010284037A (Dec. 16, 2010).

* cited by examiner

METHODS AND SYSTEMS FOR MANAGING
POWER SUPPLY AT A DEVICE

RELATED APPLICATIONS

The present application is a Continuation application of co-pending U.S. application Ser. No. 14/421,141 filed on Feb. 11, 2015, which further claims the benefits of and is based on PCT application Serial No. PCT/IB2014/064921 filed on Sep. 29, 2014, the disclosures of which are hereby incorporated by specific reference thereto.

TECHNICAL FIELD

The present invention relates in general to the field of power supply management in electronic devices. More particularly, the present invention relates to methods and systems for managing power supply at a device which is capable of receiving power via a plurality of power inputs while avoiding draining too much power from a battery.

BACKGROUND ART

It has been common to power electronic devices such as MP3 players, mobile phones, CD players, etc., from power sources in an automobile through cigarette lighter receptacles. Electronic devices operating on higher voltages may be powered directly from the main battery of the automobile. When an electronic device draws power directly from the main battery, it may continue drawing power even when the automobile is not running, i.e., when there is no ignition. This could be a problem and cause the main battery to be drained quickly as it is only discharging and not charging.

DISCLOSURE OF INVENTION

Summary of Invention

The present invention discloses methods and systems for managing power supply at a device which is capable of receiving power via a plurality of power inputs. The device first determines whether or not a first condition is satisfied. When the first condition is satisfied, a first switch is maintained to be in a closed position. The device is capable of receiving power from a first power supply when the first switch is in a closed position. If the first condition is not satisfied, the device determines whether or not a second condition is satisfied. If the second condition is satisfied, the first switch is maintained in the closed position. If the second condition is not satisfied, the first switch is opened after a predefined time period, and the device becomes unable to receive power from the first power supply. The device may perform a shut-down process before opening the first switch. The predefined time is set by a user and/or administrator.

According to one of the embodiments of the present invention, the second condition is satisfied if the device is receiving power from a second power supply.

According to one of the embodiments of the present invention, the device is connected to the first power supply through a terminal block of the device. The terminal block is mounted on the device. The device is connected to the second power supply through a power connector of the device. The power connector is selected from a group consisting of: a Universal Serial Bus (USB) input port, a Direct Current (DC) input port, and an Alternating Current (AC) input port.

According to one of the embodiments of the present invention, the device sends a first message to a user and/or administrator of the device when the device stops receiving power from the second power supply. If a confirmation is received from the user and/or administrator, the first switch is opened after a predefined time period. If a confirmation is not received from the user and/or administrator, the first switch is maintained in the closed position.

According to one of the embodiments of the present invention, when the device is placed in an automobile, the first switch is closed when ignition is on, and the first switch is opened after a predefined time period when the ignition is off. The first power supply may be a main battery of the automobile, and the second power supply may be a cigarette lighter receptacle.

According to one of the embodiments of the present invention, when the device is placed in an automobile, the second condition is satisfied if an accessory (ACC) line of the automobile is in an on state.

According to one of the embodiments of the present invention, the first switch is comprised of a latch and two field-effect transistors.

DETAILED DESCRIPTION

The ensuing description provides preferred exemplary embodiments) only, and is not intended to limit the scope, applicability or configuration of the invention. Rather, the ensuing description of the preferred exemplary embodiments) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term storage medium or computer-readable medium, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps describe alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving of hardware circuitry and software.

A network interface that may be provided by a node is an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

The present invention discloses embodiments where an electronic device can be directly charged from a main battery, but when a condition is satisfied, the device shuts down after a predefined time period.

FIG. 1A is a block diagram of a device, such as device 100, according to various embodiments of the present invention. Device 100 comprises terminal block 106 and power connector 107 to receive power from first power supply 104 and second power supply 105 respectively. Device 100 also comprises load 103 and switch 102. Switch 102 can be a part of a power management circuit. In a preferred embodiment, first power supply 104 is capable of supplying power to load 103 when switch 102 is in a closed position. Second power supply 105 is capable of supplying adequate power to load 103, which may be lower than the power supplied by first power supply 104.

Device 100 has dual power supply capabilities. When there is an interruption in power received via one of the power supplies, device 100 can seamlessly start receiving power from the other power supply, provided that both the power supplies are connected to device 100. It should be appreciated that the present invention is not limited to device 100 being capable of receiving power from two power supplies, such that device 100 may receive power through one or more power supplies through one or more power connectors respectively.

Device 100 may further comprise at least one processing unit, at least one storage medium, and a system bus connecting the components of device 100. In one variant, device 100 may also comprise one or more network interfaces through which device 100 may connect to a network, acting as a network host, network node, or etc.

In an exemplary embodiment, second power supply 105 is connected to load 103 through a voltage converter, where second power supply 105 may be a cigarette lighter receptacle of a car. First power supply 104 may be the main battery of the car, and there may be fluctuations in the power received from first power supply 104 occasionally. When the ignition of the car is turned on, power through first power supply 104 may fluctuate initially. Then load 103 may draw power from second power supply 105. Power may be received from second power supply 105 through the voltage converter in order to convert the voltage of the power supplied by second power supply 105, as the voltage may be unstable or may exceed the expected range for load 103. Ignition is said to be on when the ignition switch is in an on position, i.e. the engine of the vehicle is on.

FIG. 1B is a block diagram of device 100, according to one of the embodiments of the present invention. The difference between FIG. 1A and FIG. 1B is that in FIG. 1B, device 100 has power management circuit 110 and input 111 through which device 100 connects to an accessory line (ACC line). Power management circuit 110 may comprise switch 102. Input 111, power connector 107 and terminal block 106 is connected to power management circuit 110. Power management circuit 110 may comprise a processing unit for carrying out processes illustrated in the flowcharts of the present invention. Power management circuit 110 manages power received from the power supplies, such that power from only one of the first power supply 104 and second power supply 105 is supplied to load 103. The processing unit may control switch 102 according to configurations of device 100.

The processing unit may use information received through input 111 in order to determine whether switch 102 should be in a closed position or in an open position. In one variant, input 111 is an ACC input that may be connected to an ACC line of an automobile. In another variant, input 111 is connected to a dual in-line package (DIP) switch through which a user can manually control switch 102. The user may switch the DIP switch on or off by pressing a button mounted on device 100. Alternatively, the DIP switch can be turned on or off by using a toggle switch mounted on device 100. Alternatively, input 111 may be any input which can be used by a processing unit of device 100 to determine whether switch 102 should be in a closed position or an open position.

A power connector can be a DC input port, AC input port, a Universal Serial Bus (USB) input port, or any other type of input port through which device 100 can receive power from second power supply 105.

Load 103 may include an active electronic circuit which consumes power. Load 110 may include one or more discrete components, chips, and/or electronic systems.

An ACC line is supplied with power or the voltage is set to a non-zero value when the ignition switch is in an on position, i.e. engine of a vehicle is on. In some scenarios the ACC line might also be supplied with power when the ignition switch is in a position for supplying power to devices used in the vehicle while the engine is not on. For purposes of this invention, the ACC line is only supplied with power when the engine is on.

In one of the embodiments, a user and/or administrator can configure device 100 through a web interface, an application programming interface (API), a command line interface or a console. Alternatively, device 100 may comprise a user interface through which the user may configure device 100. The configuration may then be stored in a local storage unit of device 100 as a configuration file or as a register or memory value.

FIG. 6 is an illustrative block diagram of power management circuit 110. Power circuit 601, diode 602, switch 603, voltage converter 604, voltage divider 605 and voltage divider 606 are comprised in power management circuit 110. Processing unit 607 may be comprised in load 103. Switch 603 may be the same as switch 102 of FIG. 1A. Power from first power supply 104 and second power supply 105 is received at power circuit 601. Processing unit 607 receives signals from power circuit 601 through voltage dividers 605 and 606. Voltage dividers 605 and 606 are used for sending signals corresponding to first power supply 104 and second power supply 606 respectively, to processing unit 607. Processing unit 607 determines whether power is being received from second power supply 105 in order to control switch 603. For example, depending on whether or not power is received from second power supply 105, processing unit 607 allows switch 603 to be in a closed position or an open position. In another example, processing unit 607 allows switch 603 to be in a closed position or an open position based on a signal received through input 111. When processing unit 607 sends a signal to keep switch 603 in a closed position, power from first power supply 104 may be allowed to pass through switch 603 to voltage converter 604. Voltage converter 604 is used to convert the voltage of the power supplied by first power supply 104, as the power supplied by first power supply 104 may be unstable or may exceed or may be lower than the expected range for load 103. Voltage converter 604 may perform functions including raising/lowering voltage supplied by first power supply 104 and protecting load 103. When processing unit 607 sends a signal to keep switch 603 in an open position, load 103 no longer receives power from first power supply 104.

In one variant, the voltage converter may be in an external device, rather than in device 100. The voltage of power received from first power supply 105 and/or from second power supply 104 may be first be converted, i.e. raised or lowered, by a voltage converter in the external device. The power is therefore supplied to device 100 through the voltage converter in the external device.

Switch 102 may be a transistor such as field-effect transistors (FET), bipolar transistors, bipolar junction transistor (BJT) insulated-gate bipolar transistor (IGBT), metal-oxide-semiconductor FET (MOSFET), metal semiconductor FET (MESFET), junction FET (JFET), carbon nanotube FET (CNTFET), high-electron-mobility transistor (HEMT), heterostructure insulated gate FET (HIGFET), modulation-doped FET (MODFET), nanoparticle organic memory FET (NOMFET), organic FET (OFET), vertical-slit FET (VeSFET), tunnel FET (TFET), relay, or any other type of switches that can support more than 3.3V passing through itself, and can be controlled by a processing circuit.

Terminal block 106 is used for receiving power from first power supply 104. Terminal block 106 may be mounted on device 100.

FIG. 2A is a flowchart illustrating how a device, such as device 100, draws power from available power supplies according to one of the embodiments of the present invention. FIG. 2A is viewed in conjunction with FIG. 1 for better understanding of the embodiment.

For example, device 100 is being used in an automobile, such as a car, where the main battery acts as first power supply 104 and the power through a cigarette lighter receptacle acts as second power supply 105. Although the cigarette lighter receptacle draws power from the main battery, it may be regarded as second power supply 105 according to the present invention. One of the reasons is that power provided by the cigarette lighter receptacle is usually less than the power received directly from the main battery. In some models of cars, the cigarette lighter receptacle cannot supply power when the ignition is off.

The process starts at step 200 where device 100 is connected to both of first power supply 104 through terminal block 106 and second power supply 105 through power connector 107, or one of first power supply 104 or second power supply 105. In step 201, device 100 determines whether a first condition is satisfied. Switch 102 is closed in step 202 if the first condition is satisfied and device 100 is able to receive power from first power supply 104. If the first condition is not satisfied, device 100 determines whether a second condition is satisfied in step 203. Switch 102 is maintained to be in a closed position in step 204 and device 100 keeps monitoring whether the second condition is satisfied. If it is determined that the second condition is not satisfied, switch 102 is opened after a predefined time period in step 205, and hence device 100 is shut down. The predefined time period can be set by a user and/or administrator while configuring device 100. Device 100 can be configured by a user and/or administrator by entering configurations locally or remotely through a web interface, an application programming interface (API), a command line interface, or a console. The configurations may be stored in a storage medium of device 100.

In one variant, when a power supply is connected to a device, the device may not receive power from the power supply and may be receiving power from another power supply.

According to one of the embodiments of the present invention, the first condition may be based on one or more factors, such as position of a DIP switch, a software configuration, or any other configuration which can be used by a user and/or administrator for maintaining switch 102 in a closed position. A user and/or administrator may configure the one or more factors that the first condition may be based on.

In one example, device 100 comprises an external switch, such as a DIP switch, that can be controlled by a user and/or administrator of device 100. In step 201, the first condition is satisfied if the DIP switch is in an on state, and is not satisfied if the DIP switch is in an off state. Therefore, switch 102 is maintained to be in a closed position in step 202 if the DIP switch is in the on state. The DIP switch can be used by a user and/or administrator of device 100 to manually control switch 102. For example, if switch 102 needs to be opened or closed immediately, the user and/or administrator may choose to manually control switch 102 with the DIP switch instead of configuring device 100 or controlling second power supply 105. Controlling switch 102 manually may take less time than configuring device 100 in case of an emergency. When the predefined time period is set to a specific value, such as infinity or zero, but the user and/or administrator wants device 100 to stop receiving power from first power supply 104, the DIP switch can be used to open switch 102. Alternatively, when the predefined time is not set to zero or infinity, and switch 102 opens after a predefined time, the DIP switch can be used to close switch 102 so that device 100 starts receiving power from first power supply 104.

In another example, in step 201, device 100 determines whether the first condition is satisfied or not according to a configuration that a user and/or administrator has configured device 100 with. If the configuration is to always maintain switch 102 to be in a closed position regardless of the second condition, then the first condition is satisfied. If the configuration is to open switch 102 if the second condition is not satisfied, then the first condition is not satisfied. The configuration may be in the form of a value in a register or may be stored in a memory, such that when the value of the register is a first value, switch 102 is always maintained to be in a closed position. Alternatively, when the value of the register is a value other than the first value, switch 102 is opened after a predefined time period in step 205 if the second condition is not satisfied in step 203. The configuration may also be in the form of a configuration file stored in a storage medium of device 100, and can be used by the processing unit to execute instructions according to the configuration file.

In some scenarios, such as in an industrial setting, it may be preferred to always keep switch 102 closed. This is because in the industrial setting, first power supply 104 is likely to be from mains electricity. Since first power supply 104 is not from a battery, switch 102 does not need to be opened, as there is no possibility of draining too much power from the battery. When the user and/or administrator prefers switch 102 to be in a closed position regardless of the second condition, the user and/or administrator may keep the DIP switch in an on state, or configure device 100 with a configuration to keep switch 102 in a closed position.

In one variant, after step 202, device 100 keeps monitoring periodically whether the first condition is still satisfied.

For example, if the first condition is based on the position of a DIP switch, device 100 may monitor the position of the DIP switch periodically. While switch 102 is in a closed position in step 202, if the DIP switch is switched off and becomes in an off state after step 202, device 100 determines that the first condition is no longer satisfied and therefore step 203 is conducted.

According to one of the embodiments of the present invention, the second condition may be based on whether or not power is being received from second power supply 105. Alternatively, the second condition may be based on whether an ACC line is in an on state or an off state. Details regarding the second condition are discussed below. 10

In one example, the second condition is satisfied if device 100 is still connected to second power supply 105. If device 100 determines in step 203 that second power supply 105 is disconnected from device 100 or device 100 cannot receive power via second power supply 105, switch 102 is opened after a predefined time period specified by the timer. If device 100 determines in step 203 that second power supply 105 is still connected or can still receive power via second power supply 105, switch 102 is maintained to be in a closed position. It may be known to those skilled to those skilled in the art that in some scenarios, when ignition is off, power may not be received through the cigarette lighter receptacle. Therefore, when device 100 is unable to receive power via second power supply 105, it is determined that the ignition is off, a timer starts running and hence switch 102 is opened after a predefined time period of the timer. The timer may be reset when device 100 shuts down or is switched off.

As shown in FIG. 6, a timer may be a module in processing unit 607 of device 100. The timer module is preferably a software module. However, the timer module may also be a hardware module.

There are various reasons why using a timer may be beneficial. In step 205, processing unit 607 waits for a predefined time period before opening switch 102 so that the user and/or administrator of device 100 may take necessary steps before device 100 is shut down. Device 100 may send a notification to the user and/or administrator when the timer starts. The notification is sent in order to inform the user and/or administrator that the timer has started, and processing unit 607 may open switch 102 after the predefined time period. The notification may also be sent to request for a confirmation, which is explained in greater detail in FIG. 3. The notification may be sent via an email, an instant message, a short message service (SMS) message, a phone call, a message shown in a web page, a popup message at a web page, or other indicators that can be used to send the notification to the user and/or administrator.

In one variant, the second condition is not satisfied if device 100 has not been able to receive power via power connector 107 for at least a second predefined time period. The second predefined time period may be in the range of a few seconds to one minute. For example the predefined time period is five seconds. If, in step 203, device 100 determines that second power supply 105 has remained disconnected for more than five seconds, then device 100 opens switch 102 after a predefined time period in step 205. Alternatively, if device 100 determines that second power supply 105 was disconnected for less than five seconds and has been reconnected within five seconds, the second condition is still satisfied and device 100 maintains switch 102 in the closed position in step 204. It is possible that there may be occasional interruptions in second power supply 105, and it may not be desirable that device 100 changes the position of switch 102 every time there is an interruption in second power supply 105. Therefore, 11 if second power supply 105 has been disconnected for more than five seconds, it is an indication that this is not an interruption and that second power supply 105 has actually been disconnected.

For illustration purposes, when device 100 is connected to the main battery and the cigarette lighter receptacle, in step 203, device 100 determines whether the ignition is on or off by checking if it can receive power via the cigarette lighter receptacle. If the ignition is on, device 100 continues drawing power from the main battery or cigarette lighter receptacle by maintaining switch 102 in the closed position in step 204. If the ignition is turned off, device 100 determines to open switch 102 after a predefined time period in step 205. Therefore device 100 shuts down safely and opens switch 102 so that it stops drawing power from the main battery. One of the benefits of device 100 automatically shutting down when the ignition is off is that draining of the main battery is avoided.

However, in some scenarios, it is possible that a cigarette lighter receptacle continues supplying power even when ignition is off. In such cases, device 100 may require other information in order to detect whether ignition is on or off. For example, device 100 may comprise an external DIP switch which the user and/or administrator can turn on or off when ignition is on or off respectively. Alternatively, wiring of the car may be done such that when ignition is turned on with a key, a signal may be sent to device 100 directly.

In some scenarios, when ignition is off, the cigarette lighter receptacle may still be able to supply power with significantly low voltage. Therefore in step 203, the second condition is not satisfied when there is a significant drop in the voltage through the cigarette lighter receptacle and device 100 determines that the ignition is off.

Alternatively, device 100 is connected directly to an ACC line, which is in an on state when ignition is on, and is in an off state when ignition is off. In step 203, device 100 determines whether the ignition is on or off by checking the ACC line. The second condition is satisfied if the ACC is in an on state. Using the ACC line to determine whether ignition is on or off is beneficial when device 100 is used in car where the cigarette lighter receptacle can supply power even when the ignition is off.

In one of the embodiments of the present invention, when device 100 detects that the second condition is not satisfied in step 203, the timer is started. After the timer is started and before opening switch 102, device 100 may perform various functions of a shut-down process during the predefined time period. The various functions may include safely terminating any ongoing processes and/or gracefully shut-down device 100. For example, before device 100 is shut down, it may save data in its storage medium or in a remote storage medium and then terminate the ongoing processes. In another example, if device 100 is connected to remote device(s) through wired or 12 wireless networks, it informs the remote device(s) that it is going to be turned off after the predefined time period ends.

According to one of the embodiments of the present invention, step 201 and 202 may be omitted, as illustrated in FIG. 2B. In FIG. 2B, if the second condition is satisfied in step 203, switch 102 is maintained in a closed position. If the second condition is not satisfied in step 2013, a timer starts running for a predefined time period, and switch 102 is opened after the predefined time period. However, if the predefined time period is set to a very high value, it is likely that switch 102 is maintained in a closed position even when the second condition is not satisfied. Therefore, if the user and/or administrator prefers switch 102 to be maintained in a closed position, i.e. a preferred position of switch 102 is the closed position, then the predefined time period of the timer may be set to a very high value. Alternatively, the user and/or administrator may also set the predefined time period of the timer to zero if the preferred position of switch 102 is the closed position. Therefore, even when the second condition is satisfied in step 203, the timer does not start, and switch 102 remains in the closed position.

FIG. 3 is a flowchart illustrating a process according to one of the embodiments of the present invention. FIG. 3 is viewed in conjunction with FIG. 2A for better understanding. Device 100 sends a message to a user and/or administrator after step 201 or after step 203. If the first condition is satisfied in step 201, device 100 sends a message at step 301 for informing the user and/or administrator that device 100 is waiting for a confirmation in order to maintain switch 102 in a closed position. If a confirmation is received in step 302 from the user and/or administrator to maintain switch 102 in the closed position, then device 100 maintains switch 102 in a closed position in step 202. Therefore device 100 continues drawing power from first power supply 104. If the user and/or administrator instead sends a message to open switch 102 after a predefined time period, then switch 102 is opened after the predefined time period in step 205.

Alternatively, if the first condition is not satisfied in step 201, and the second condition is not satisfied in step 203, device 100 sends a message at step 301 for informing the user and/or administrator that device 100 has determined to open switch 102 after a predefined time period. If a confirmation is received in step 302 from the user and/or administrator to open switch 102 after the predefined time period, then device 100 opens switch 102 after the predefined time period in step 205. If the user and/or administrator instead sends a message to maintain switch 102 in a closed position, then device 100 maintains switch 102 in the closed position.

In one of the embodiments, the user and/or administrator confirms opening switch 102 after a predefined time period in step 302, and also specifies the predefined time period. For example, the predefined time period stored in device 100 is initially twenty 13 minutes. In step 301, device 100 sends a message to the user and/or administrator to confirm whether switch 102 should be opened after twenty minutes in step 205. In response to the message, the user and/or administrator sends another message to device 100 confirming that switch 102 should be opened after thirty minutes, and not twenty minutes. In this way the user and/or administrator can change the predefined time period. Device 100 then opens switch 102 after thirty minutes in step 205.

In one of the embodiments, step 302 is omitted. If the first condition is satisfied in step 201, device 100 sends a message in step 301 informing the user and/or administrator that switch 102 will be maintained in the closed position. Device then continues to step 202 and maintains switch 102 in a closed position without waiting for a confirmation from the user and/or administrator. Alternatively, when the first condition and second condition is not satisfied, device 100 sends a message in step 301 informing the user and/or administrator that switch 102 will be opened after a predefined time period. Device 100 then continues to step 205 and opens switch 102 after the predefined time period without waiting for the confirmation from the user and/or administrator. This is done so that the user and/or administrator is aware of the operations of device 100.

FIG. 4 illustrates a process carried out by a user and/or administrator of device 100 one of the embodiments of the present invention. For example, the user may prefer device 100 to always receive power from first power supply 104, even when second power supply 105 is connected. The user may then connect device 100 to first power supply 104 through terminal block 106 in step 400. If the user determines that device 100 is receiving power from first power supply 104 in step 401, the user allows device 100 to continue receiving power from first power supply 104 in step 405. Alternatively if the user determines that device 100 cannot receive power from first power supply 104 in step 401, the user connects second power supply 105 in step 402. The user then configures device 100 such that switch 102 is closed regardless of whether second power supply 105 is connected or not. When switch 102 is closed, device 100 can receive power from first power supply 104. The user disconnects second power supply 105 from device 100 is step 404 and device 100 continues receiving power from first power supply 104. Step 404 is optional, and second power supply 105 may remain connected to device 100.

When both first power supply 104 and second power supply 105 are connected to device 100, second power supply 105 can supply power to device 100 when power from first power supply 104 is interrupted, and therefore second power supply 105 can act as a backup power supply.

In one variant, depending on the voltage levels of first power supply 104 and second power supply 105, the power supply with the higher voltage may supply power to 14 device 100.

FIG. 5 illustrates a process of configuring device 100 when there is a change of environment according to one of the embodiments. FIG. 5 is viewed in conjunction with FIG. 1A and FIG. 1B for better understanding of the embodiment. For illustration purpose, device 100 is moved from an industrial setting to a car setting. In an industrial setting, it is preferred to use a power supply with high voltage. Therefore, when device 100 is being used in an industrial setting, it is configured to use first power supply 104 regardless of whether second power supply 105 is connected or not. Alternatively, when device 100 is used in a car, device 100 is configured to open switch 102 when the ignition is off and maintain switch 102 in the closed position when ignition is on. When ignition is off, a cigarette lighter receptacle may not supply power or the ACC may be in the off state.

The process starts at step 500 where a user may connect device 100 to first power supply 104 through terminal block 106 and to second power supply 105 through power connector 107. In step 501, device 100 determines whether switch 102 is in a closed position. If switch 102 is not in a closed position and a second condition is satisfied in step 502, switch 102 is closed and is maintained in the closed position in step 503. The second condition is satisfied if second power supply 105 is connected or the ACC is in an on state. Device 100 continues monitoring whether the second condition is satisfied in step 502 after switch 102 is closed in step 503. If device 100 detects that the second condition is not satisfied in step 502, switch 102 is opened after a predefined time period in step 504.

When device 100 is being used in a car, it should be configured such that switch 102 is maintained in a closed position only when the second condition is satisfied, i.e. the ignition of the car is on. When the ignition of the car is off, switch 102 should be opened after a predefined time period so that the main battery of the car is not drained.

If device 100 determines that switch 102 is closed in step 501, and the second condition is satisfied in step 505, switch 102 is maintained in the closed position in step 503. If device 100 detects that the second condition is not satisfied in step 502, switch 102 is opened after a predefined time period in step 504.

If device 100 determines that the second condition is not satisfied in step 505, it determines whether device 100 is being used in a car in step 506. If device 100 is not being used in a car, switch 102 is maintained in the closed position in step 510.

If device 100 is being used in a car, processing unit 607 of device 100 determines a configuration corresponding to operating in a car in step 507. Device 100 sends a request to a user and/or administrator in step 508 for reconfiguring device 100 because its environment has changed from an industrial setting to a car. The request can be sent via an email, an instant message, a SMS, a phone call, a message shown in a web page, a popup message at a web page, or other indicators that can be used to send the request to the user and/or administrator.

In one example, in step 508, device 100 sends a request for configuring device 100 manually and informing the user and/or administrator that the environment of device 100 has changed. The user and/or administrator can then reconfigure device 100 in step 509 according to the request.

In another example, a configuration corresponding to operating in a car is stored in device 100. Therefore, in step 508, device 100 sends a request informing the user and/or administrator that device 100 has determined the configuration corresponding to operating in a car, and for receiving a confirmation from the user and/or administrator. After receiving confirmation from the user and/or administrator, device 100 then reconfigures itself in step 509 with the configuration corresponding to operating in a car. In one variant, device 100 reconfigures itself without waiting for a confirmation from the user and/or administrator.

In one variant, step 508 is omitted and device 100 reconfigures itself in step 509 after determining the configuration corresponding to operating in a car in step 507.

After reconfiguring in step 509, device 100 monitors whether the second condition is satisfied in step 502. Hence, switch 102 is maintained in the closed position in step 503 if the second condition is satisfied, and is opened after a predefined time period in step 504 if the second condition is not satisfied.

Step 506 may be performed in various ways. In one variant, processing unit 607 determines whether device 100 is being used in a car by checking whether device 100 is connected to an ACC line through input 111. If device 100 is not connected to an ACC line, processing unit 607 determines that device 100 is not being used in a car and the switch is maintained in the closed position in step 510. If device 100 is connected to an ACC line, processing unit determines that device 100 is being used in a car. In another variant, device 100 may have one or more buttons or DIP switches which can be used by a user and/or administrator to allow processing unit 607 to determine that device 100 is being used in a car.

In one of the embodiments of the present invention, device 100 is a network device, such as a router. Device 100 can be used to connect to networks through wired or wireless connections. For example, device 100 establishes one or more Virtual Private Network (VPN) connections with a remote node. The one or more VPN connections can be aggregated to form an aggregated VPN connection. Device 100 may use its credentials for authentication and security purposes when establishing the one or more VPN connections. When the timer has started running, device 100 sends out notifications to the remote devices and/or to hosts that connect to other networks through device 100 to notify them that device 100 is going to shut down within a predefined time period. This is beneficial in scenarios where there are one or more ongoing data sessions which should be terminated safely and one or more nodes or hosts belonging to the one or more data sessions are aware that device 100 is going to shut down. A notification can be displayed on a user interface of a host that connects to a VPN through device 100 that the VPN connection is about to be disconnected since device 100 will be shut down.

In other examples, when device 100 is a router used for connecting to a network for applications such as video conferencing, filling an online application form, VoIP calls, and many other applications, it is beneficial to receive a warning that the session will be terminated. Therefore, for this purpose, device 100 sends messages to hosts or nodes during the predefined time period.

Device 100 can be used in different environments and can be configured differently according to the environments.

As discussed above, when device 100 is being used in a car, it is preferably configured to receive power via terminal block 106 from first power supply 104 while the engine of the car is on, and opening switch 102 after a predefined time period if the engine of the car is off so that the device 100 no longer draws power from first power supply 104. This is beneficial because it is desirable that the main battery of the car is not drained completely while the engine is off.

Alternatively, when device 100 is being used in an industrial setting, it is preferably configured to receive power via terminal block 106 from first power supply 104 regardless of whether second power supply 105 is connected or the status of input 111. In an industrial setting, it is likely that a power supply with high voltage would be available to act as first power supply 104.

In one of the embodiments, when device 100 is being used in an industrial setting, the first power supply is a battery and the second power supply is the mains electricity. Device 100 preferably uses power from the second power supply whenever available. When the second power supply is disconnected for reasons such as a power outage, device 100 starts using power from the first power supply. Device 100 also starts the timer so that switch 102 is opened after the predefined time period. Therefore, after the predefined time period, device 100 shuts down and stops drawing power from the first power supply. In one variant, device 100 preferably receives power from the battery, which is the first power supply via terminal block 106. Terminal block 106 may be able to handle higher voltages, and hence device 100 receives high voltage power through terminal block 106. The battery may be charged from the mains electricity. When there is a power outage, device 100 determines to open switch 102 after a predefined time period.

Alternatively, when device 100 is being used in a home setting, it is likely that a power supply with high voltage would not be available for connecting to device 100 through terminal block 106. Therefore, when device 100 is being used in a home setting, it receives power via power connector 107 from second power supply 105. Second power supply 105 may be the mains electricity which may supply power to device 100 using a DC power adapter, an AC power adapter, a Universal Serial Bus (USB), or through any other medium through which power can be supplied to device 100.

It should be noted that, in all of the above scenarios, device 100 has dual power supply capabilities. There is no restriction that the number of power supplies is two. More than two power supplies may be used for device 100. Device 100 is capable of receiving power from either one of the power supplies. When one of the power supplies is abruptly disconnected, or there is an interruption in power being received from one of the power supplies, device 100 can start receiving power from the other power supply, such that the ongoing processes in device 100 are not interrupted due to interruption in the power supply.

When car engine is turned on, switch 102 may either be open or close initially. According to the embodiments described above, when ignition of a car is turned off, switch 102 may be opened such that device 100 stops receiving power from first power supply 104. When ignition of the car is again turned on, processing unit 607 may detect that the car is on by receiving a signal due to power received through second power supply 105. Processing unit 607 may then send a signal to close switch 603 so that device 100 may start receiving power from first power supply 104.

According to one of the embodiments, when switch 102 opens due to the ignition being turned off, switch 102 may again be closed if first power supply 104 is disconnected from power connector 107. Power is not drained from first power supply 104 even when the switch is closed, since first power supply 104 is disconnected. In this way, the next time ignition is turned on, switch 102 is already closed. If first power supply 104 is connected to device 100 again at a time when ignition is not on, processing unit 607 may check whether ignition is on and accordingly open switch 102 as described in the above embodiments.

FIG. 7A is an illustrative schematic of a circuit used by processing unit 607 of device 100 for detecting whether power is being received through second power supply 105 according to one of the embodiments of the present invention. DC_IN 701 is connected to power connector 107. Power from second power supply 105 may be received at DC_IN 701. Resistors R1 and R3 form a voltage divider. Resistors R7 and R8 form another voltage divider. Comparator 704 compares voltage at point 702 (VA) and voltage at point 703 (VB). LP211 from Texas Instruments Incorporated is used as comparator 704 in a preferred embodiment. However, there is no limitation that LP211 18 must be used. For example, when the operating voltage of device 100 is 3.3V, 3.3V may be used as a reference voltage, and DC_IN 701 is compared against the reference voltage. The emitter output (EO Pin 1) of comparator 704 is connected to ground. The ratio of R1 to R3 and the ratio of R7 to R8 may or may not be same. Voltage at DC_IN 701 may be in the range of 6V-24V. Therefore, even when R7:R8 is higher than R1:R3, VA may be higher than VB. For example, when voltage at DC_IN 701 is approximately 6V, the ratio R7:R8 should be less than double of R1:R3, so that VA may be compared to VB. When VA is higher than VB, collector output (CO Pin 7) becomes high impedance. CO Pin 7 is an open collector, such that the output can be disconnected (high impedance) or low (ground). When CO Pin 7 output is high impedance, resistor R4 pulls up the voltage to 3.3V in order to generate a logical signal 1 at DC_IN_IO 706. Alternatively, when VA is lower than VB, output at CO Pin 7 is low, and a logical signal 0 is generated at DC_IN_IO 706. DC_IN_IO 706 is an input to processing unit 607 of device 100. For example, when power is being received from second power supply 105, VA is likely to be higher than VB, and hence DC_IN_IO 706 is 1. Thus processing unit 607 receives a logical signal of 1 through DC_IN_IO 706 and determines that power is being received through second power supply 105.

FIG. 7B is an illustrative schematic of a circuit used by processing unit of device 100 for controlling power received from first power supply 104 according to one of the embodiments of the present invention. First power supply 104 is connected to Terminal_Block_IN 710 through terminal block 106. A voltage divider, which comprises resistors R9 and R10, outputs a voltage at point 712, which is lower than the voltage of power received through first power supply 104. For readability, the output voltage is referred to be VDD_Terminal 711. Latch 718 is controlled by processing unit 607 of device 100 through data input (D) pin 3 and latch enable input (LE) pin 1. NC7SZ373 from Fairchild Semiconductor Corporation is used as latch 718 in a preferred embodiment. However, there is no limitation that NC7SZ373 must be used. Voltage at VDD_Terminal 711 is an input to VCC Pin 5 of latch 718. As the voltage at Terminal_Block_IN 710 may exceed the maximum voltage that latch 718 can handle, VDD_Terminal 711 is used instead of connecting directly to Terminal_Block_IN 710. Capacitor Cl 717 is used as a decoupling capacitor in order to reduce the noise at VCC pin 5. TerminalBlock_IN_CTRL 713 and TerminalBlock_IN_LATCH_EN 714 are inputs from processing unit 607 to D pin 3 and LE pin 1 respectively. VDD25 715 is from processing unit 607, and voltage at VDD25 715 is about 2.5V. Resistors R12 and R13 are used to pull up the voltage at TerminalBlock_IN_CTRL 713 and TerminalBlock_IN_LATCH_EN 714 respectively. Voltage at VDD_terminal 711 may be higher than voltage at VDD25 715. For illustration purpose, processing unit 607 may maintain the input at LE pin 1 at high logic level and may change the input at D pin 3 in order to control the output at latch output (Q) pin 4 of latch 718. When input at LE pin 1 is high, and input at D pin 3 is high, output at Q pin 4 is high impedance. Q pin 4 is then an open drain connection, and thus VDD_terminal 711 is connected to Q pin 4 through R14 in order to pull up the voltage to about the voltage at VDD_Terminal 711, which is about the same as VDD_terminal 711. As output enable input (OE) pin 6 is not used, it may be connected to ground through resistor R16. Resistor R17 may be used for reducing current at gate of NFET 720. When Q pin 4 is high, gate voltage (VG) is approximately equal to voltage at VDD_Terminal 711. Therefore, when Q pin 4 is high, NFET 720 is conducting, such that source voltage (VS) and drain voltage (VD) of NFET 720 is about the same. Resistor R15 is used for reducing the current flow towards ground from Terminal_Block_IN 710. Resistor R11 is used for pulling up voltage of PFET 721 to the voltage at Terminal_Block_IN 710 when PFET 721 is conducting. Consequently, when NFET 720 is conducting, the voltage at pin 3 of PFET 721 is higher than the voltage at pin 4 of PFET 721, and hence PFET 721 becomes conducting. When PFET 721 is conducting, and input at Pin 3 of PFET 721 is connected to first power supply 104 through Terminal_Block_IN 710, output at Pin 5 of PFET 721 becomes approximately equal to the voltage at Terminal_Block_IN 710. Diode D1 723 is used to ensure that current direction is only toward VIN 724, and prevent current from flowing towards PFET 721 in case of a voltage drop. VIN 724 is connected to load 103 of device 100. Therefore, when processing unit 607 sends a high input signal through TerminalBlock_IN_CTRL to D pin 3 and through TerminalBlock_IN_LATCH_EN to LE pin 1, NFET 720 and PFET 721 are conducting, and load 103 is supplied with power from first power supply 104 through VIN 724. Alternatively, when processing unit sends a low input signal through TerminalBlock_IN_CTRL to D pin 3, and maintains input signal through TerminalBlock_IN_LATCH_EN to LE pin 1 at high, output at Q pin 4 is low. When output at Q pin 4 is low, NFET 720 is not conducting, and hence PFET 721 is also not capable of conducting. Therefore, load 103 is not supplied with power from first power supply 104 through VIN 724. A voltage divider may be connected between VIN 724 and load 103 in order to reduce the voltage at load 103 to 3.3V.

In one example, for illustration purpose, device 100 is being used in a car. As discussed in FIG. 2A, when device 100 is used in a car, it is preferred that device 100 is turned off when the ignition of the car is turned off in order to avoid draining power from main battery of the car. When ignition of the car is turned off, voltage at DC_IN 701 may become zero or very low, as DC_IN 701 is connected to cigarette lighter receptacle or ACC line of the car. Therefore, VA is determined to be lower than VB, and output at CO pin 7 is low. DC_IN_IO 706 is at about zero volt, and a logical signal of 0 is input to processing unit 607. As a result, processing unit 607 may turn off device 100 after a predefined time period specified in a timer or in a setting. When the predefined time period is over, processing unit 607 may send a logical signal 0 to latch 718 through TerminalBlock_IN_CTRL 713 at D pin 3 of latch 718. When input at D pin 3 is low, output at Q pin 4 of latch 718 becomes low, and hence NFET 720 stops conducting. When NFET 720 stops conducting, PFET 721 also stops conducting, and device 100 is consequently turned off, as load 103 stops receiving power through VIN 724. When device 100 is turned off, input at LE pin 1 also becomes low, and output at Q pin 4 is maintained at low.

In another example, device 100 may shut down suddenly while ignition of the car is still on. In this case, load 103 stops receiving power through VIN 724. However, latch 718 may continue its operation, as it may still receive power from main battery of the car at VDD_terminal 711. Power consumed by latch 718 is not too high. If device 100 is turned on again at a time when car ignition is off, there is a possibility that load 103 again starts drawing power from the main battery, and the main battery may then be drained. When device 100 is on while car ignition is off, VA is determined to be lower than VB, and thus processing unit 607 sends a logical signal 0 through TerminalBlock_IN_CTRL 713 such that PFET 721 stops conducting and load 103 stops drawing power from the main battery through Terminal_Block_IN 710. Hence device 100 is shut down again. If car ignition is on and VA is determined to be higher than VB, then processing unit 607 may send a logical signal 1 to D pin 3 and hence PFET 721 starts conducting and load 103 is capable of receiving power from the main battery.

The embodiments were chosen and described in order to best explain the principles of the invention and its practical applications, to thereby enable others skilled in the art to best utilize the invention and various embodiments with various modifications as are suited to the particular use contemplated.

Figure 1A:
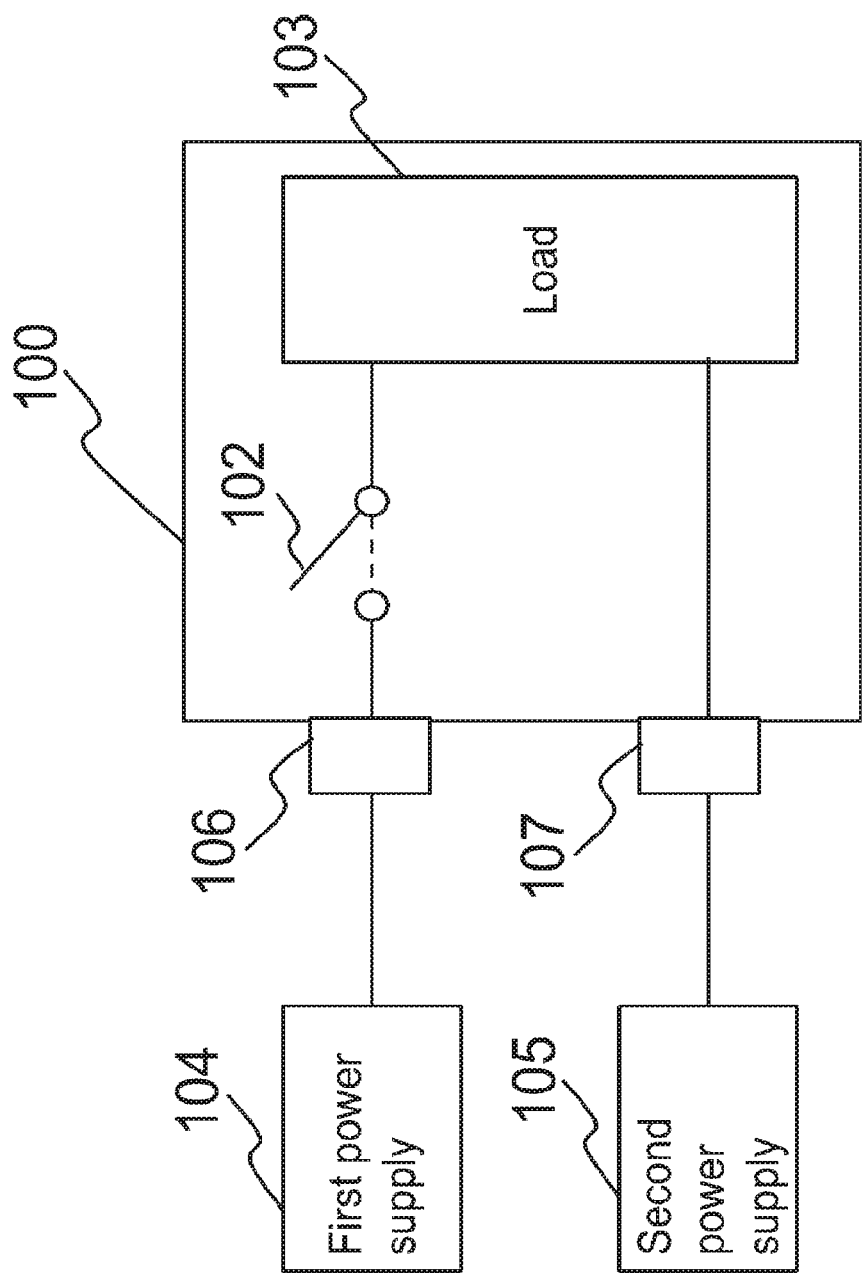
FIG. 1A is an illustrative block diagram of a device according to one of the embodiments of the present invention.
Figure 1B:
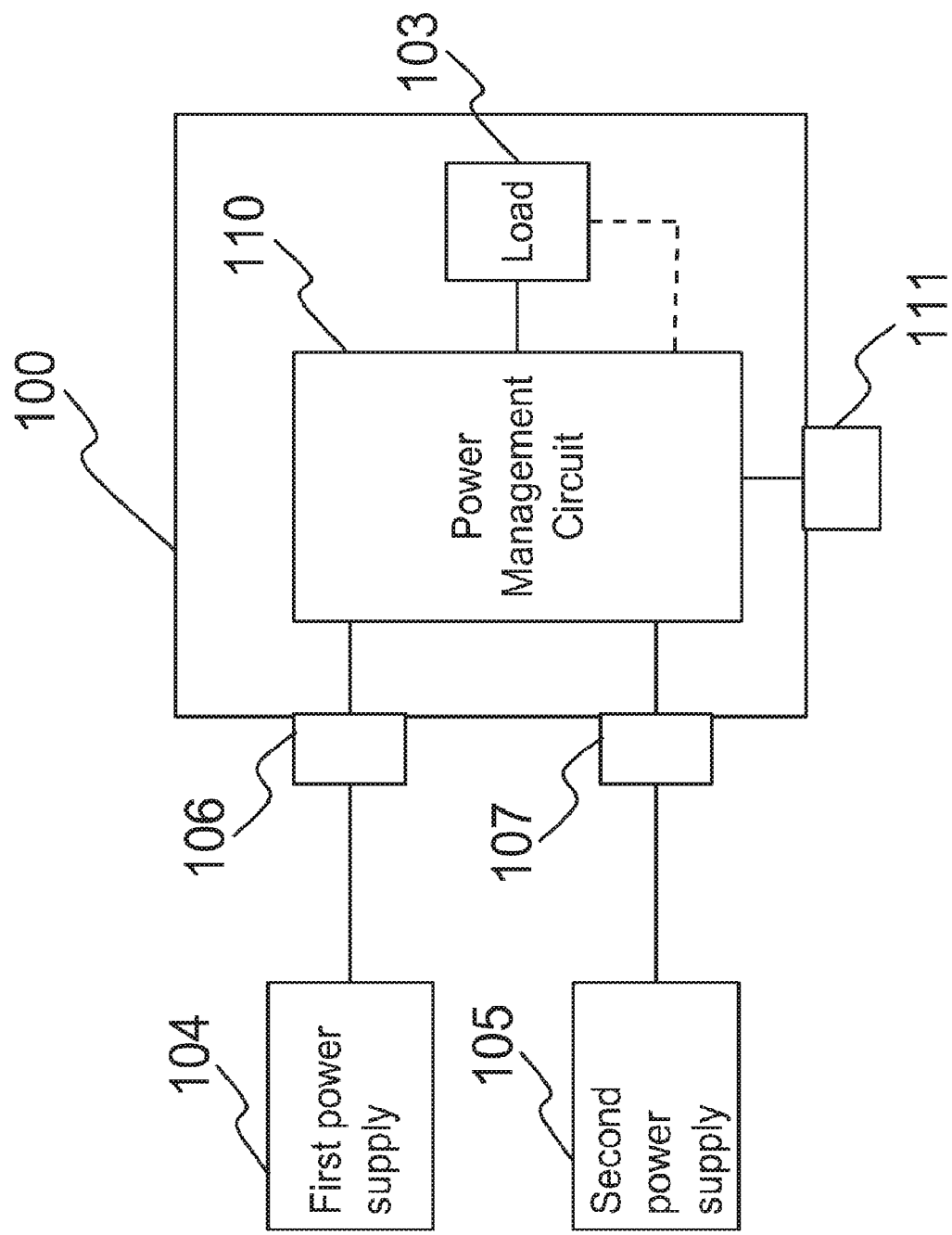
FIG. 1B is an illustrative block diagram of a device according to one of the embodiments of the present invention.
Figure 2A:
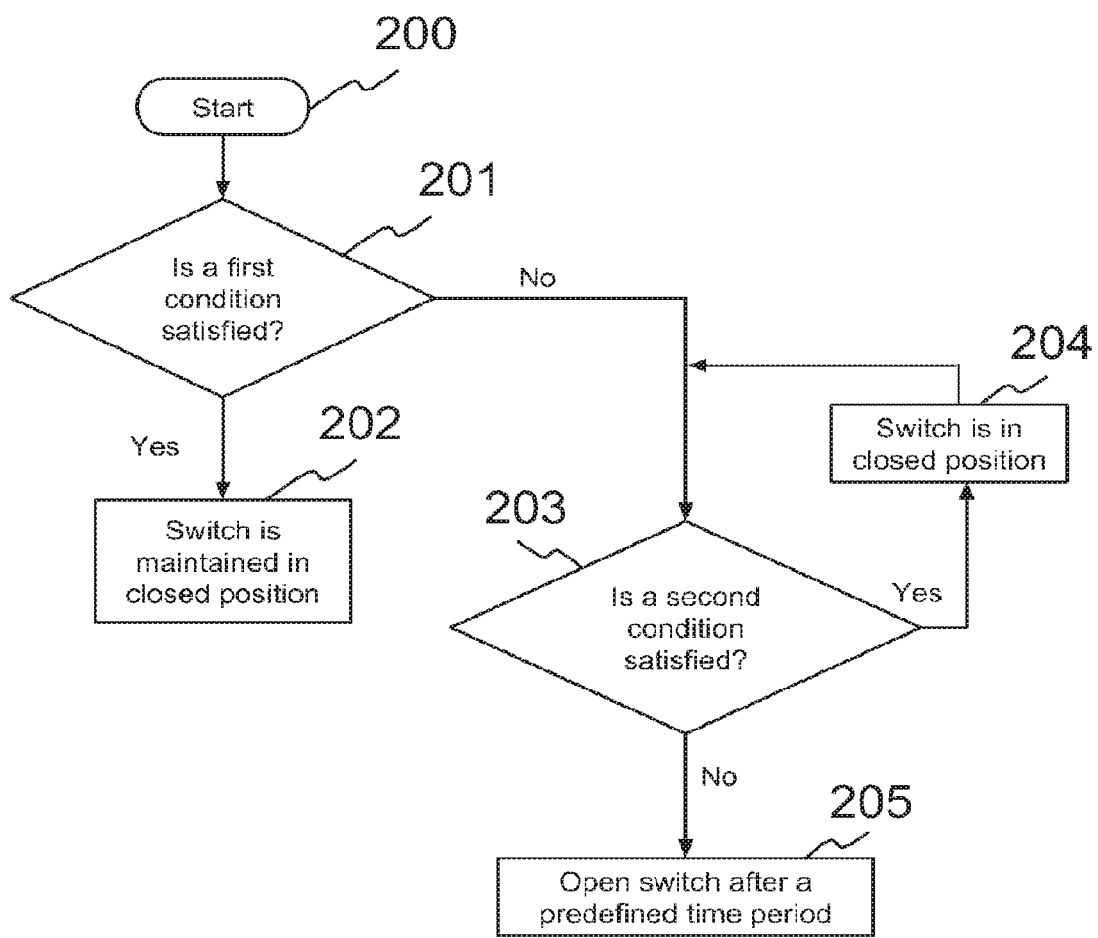
FIG. 2A is a flowchart illustrating a process for managing power supply at a device according to one of the embodiments of the present invention.
Figure 2B:
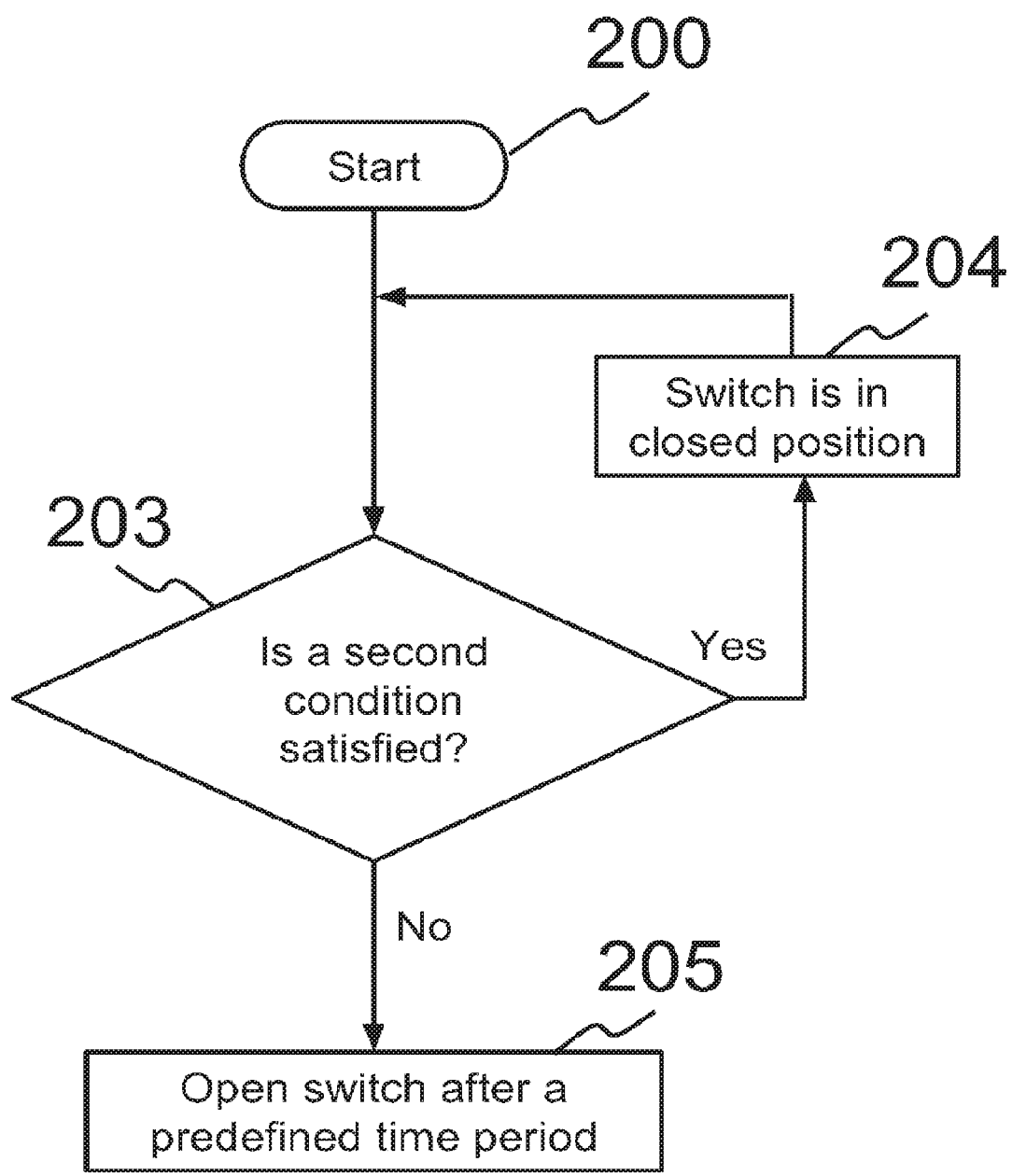
FIG. 2B is a flowchart illustrating a process for managing power supply at a device according to one of the embodiments of the present invention.
Figure 3:
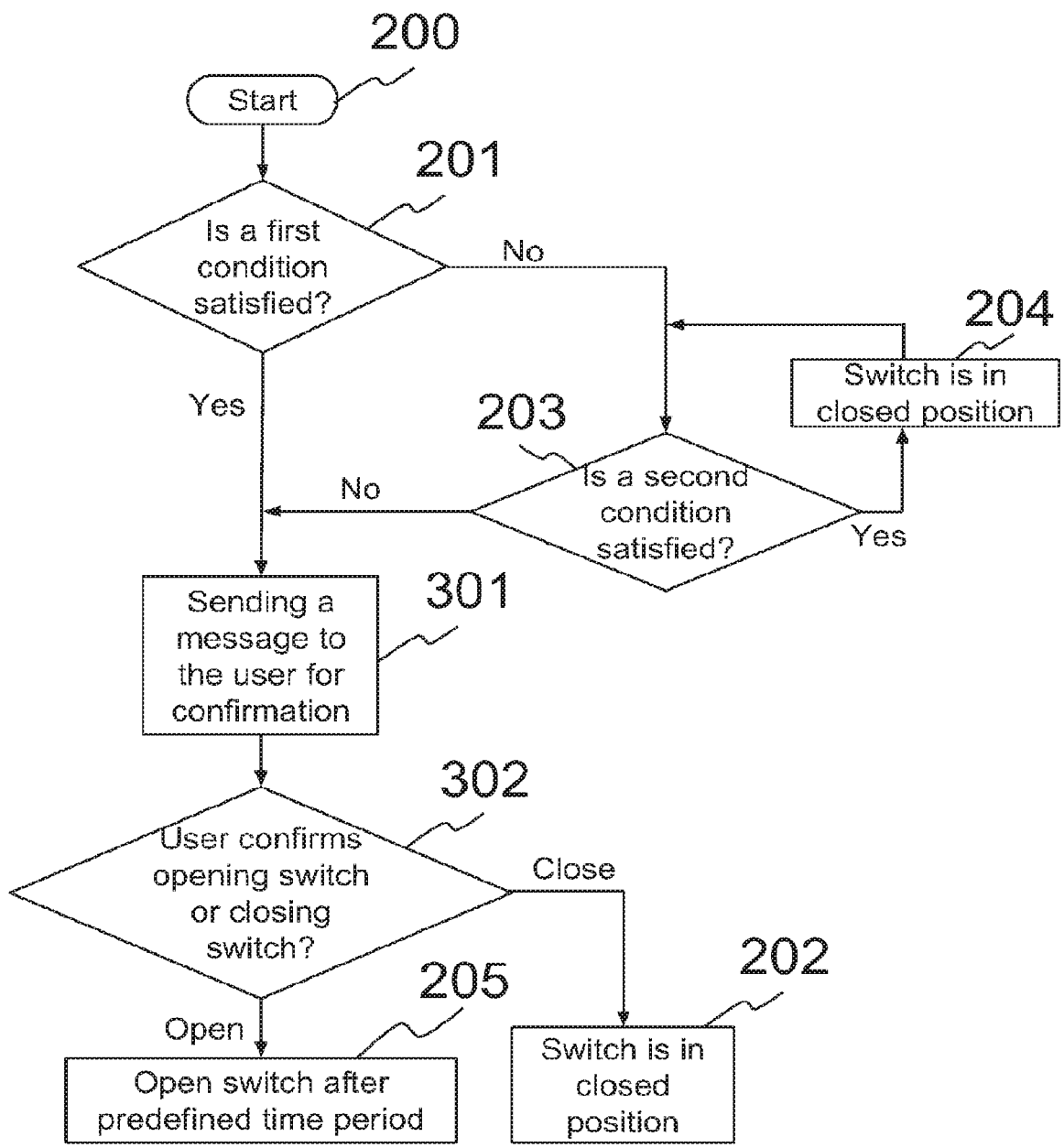
FIG. 3 is a flowchart illustrating a process for managing power supply at a device according to one of the embodiments of the present invention.
Figure 4:
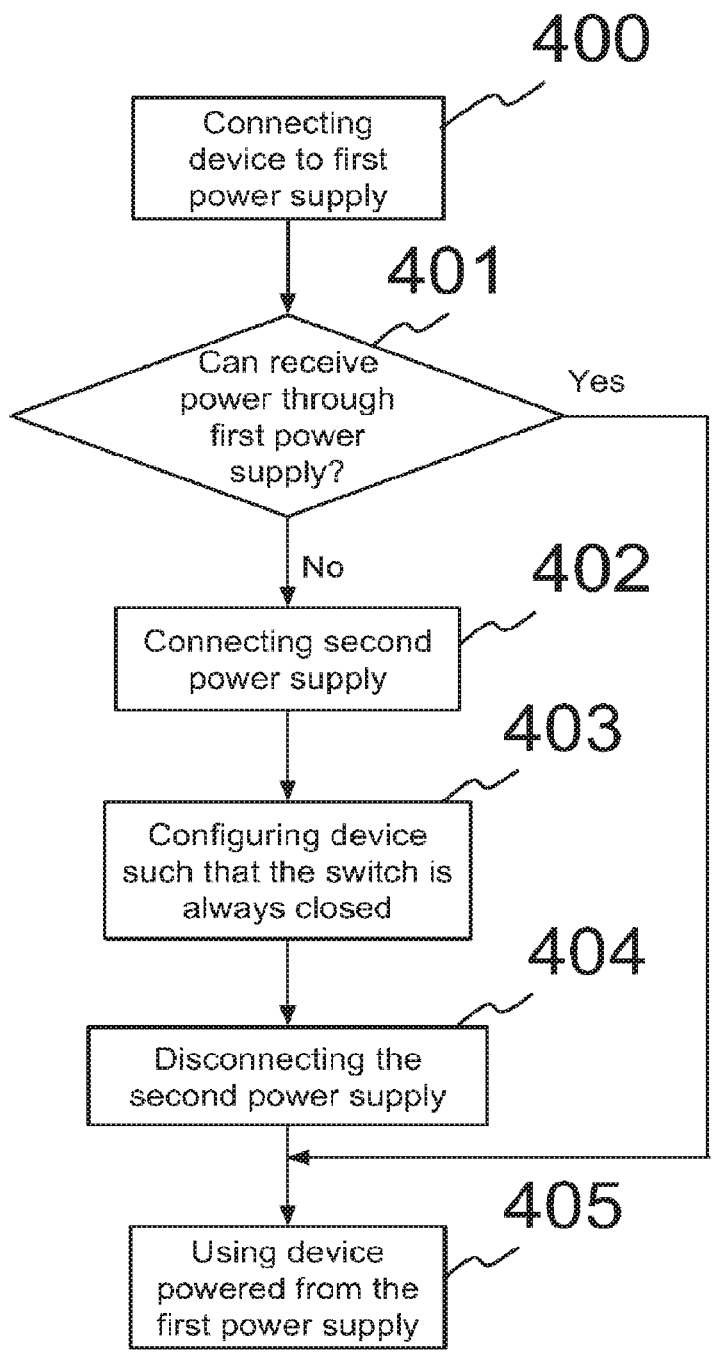
FIG. 4 is a flowchart illustrating a process performed by a user and/or administrator for managing power supply at a device according to one of the embodiments of the present invention.
Figure 5:
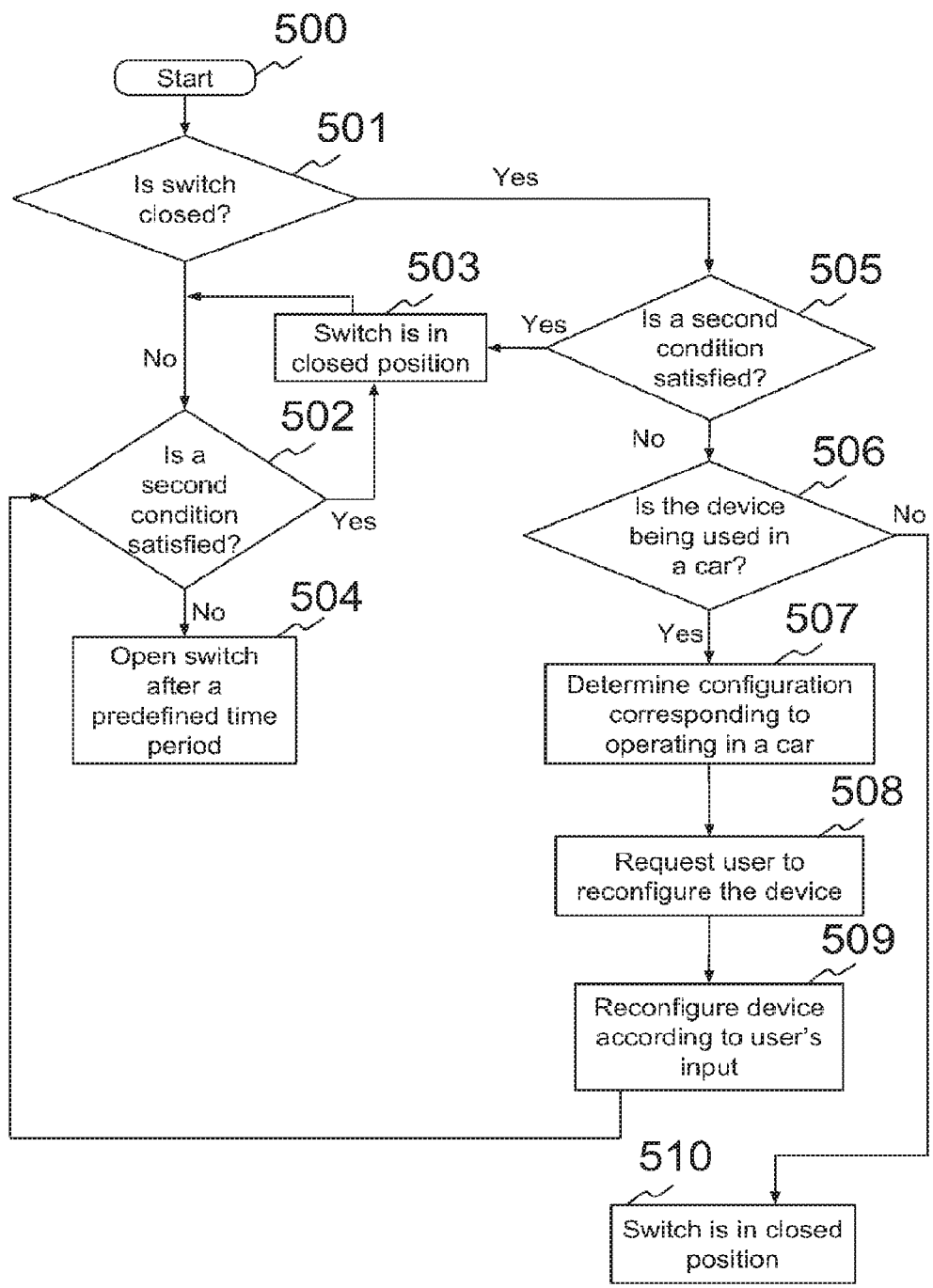
FIG. 5 is a flowchart illustrating a process for managing power supply at a device according to one of the embodiments of the present invention.
Figure 6:
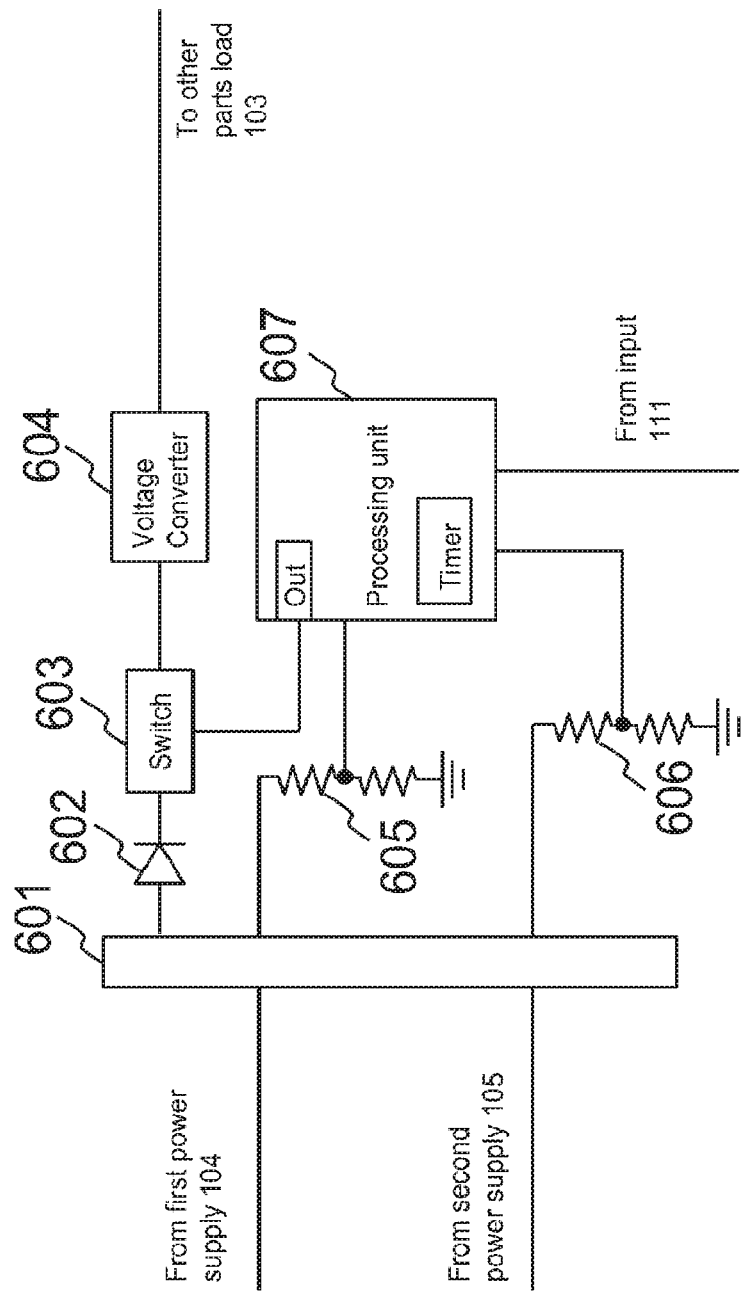
FIG. 6 is an illustrative block diagram of a power management circuit according to one of the embodiments of the present invention.
Figure 7A:
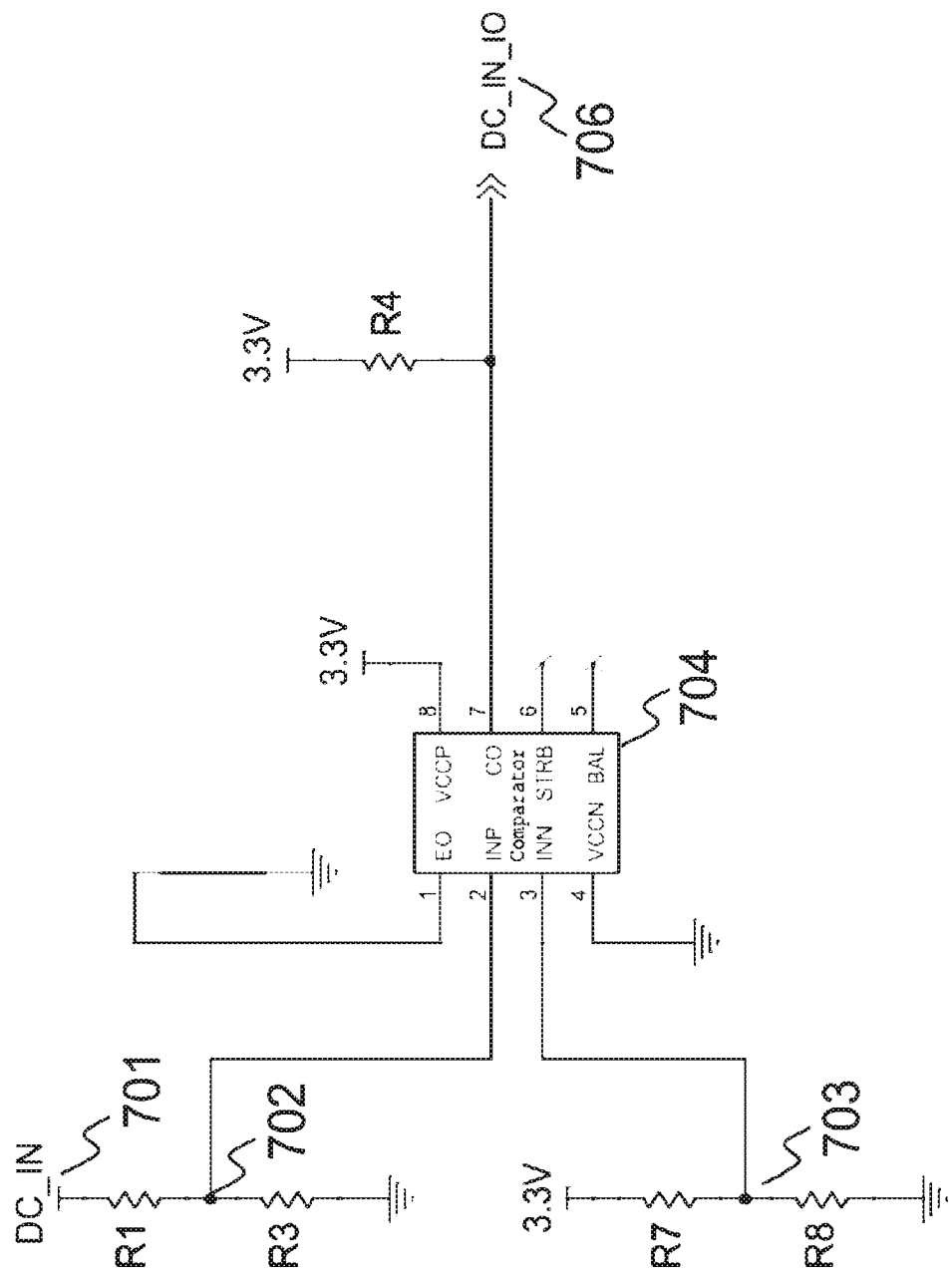
FIG. 7A is an illustrative schematic of a circuit used by processing unit 607 of device 100 for detecting whether power is being received through second power supply 105 according to one of the embodiments of the present invention.
Figure 7B:
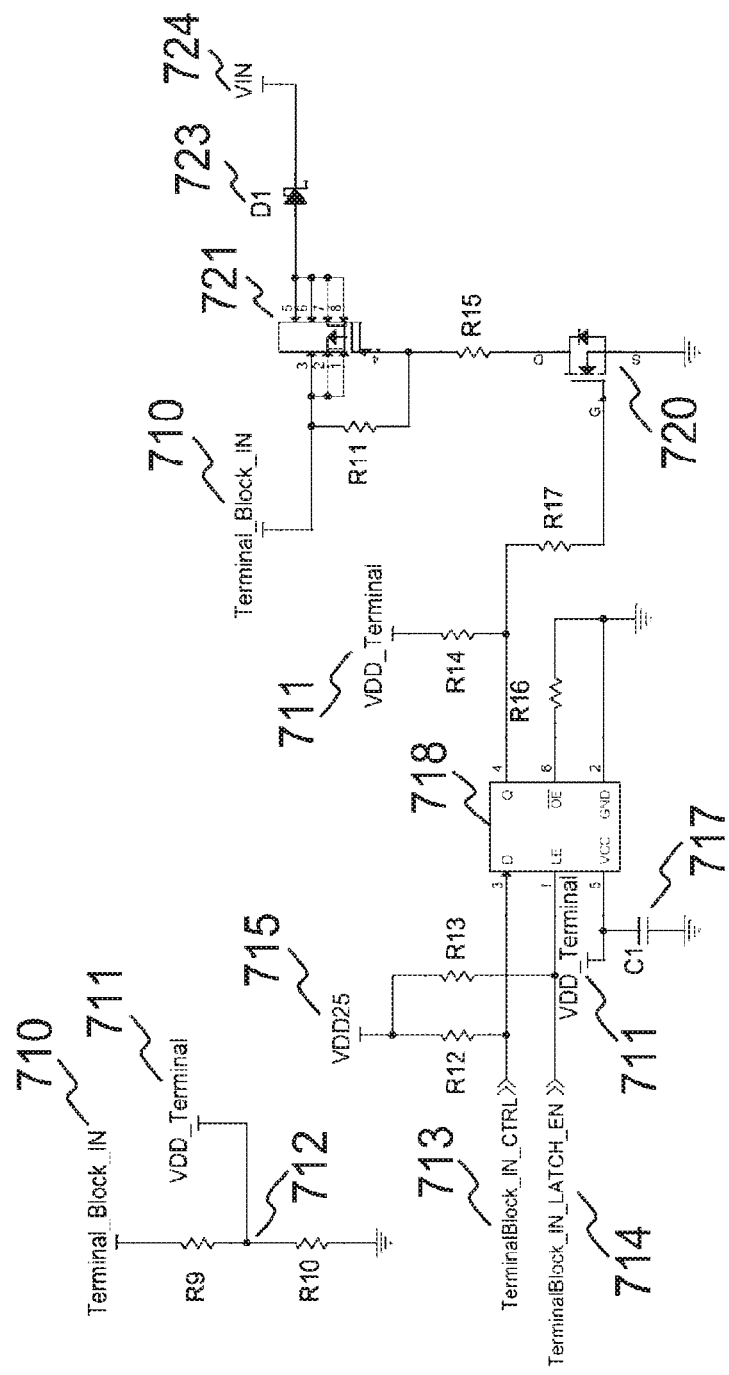
FIG. 7B is an illustrative schematic of a circuit used by processing unit of device 100 for controlling power received from first power supply 104 according to one of the embodiments of the present invention.

The invention claimed is:

1. A method for receiving power supply at a device, wherein the device is connected to a first power supply and a second power supply, comprising:
   a. detecting whether voltage at the second power supply is below a reference voltage;
   b. when the voltage at the second power supply is below the reference voltage:
      i. maintaining a switch in a closed position for receiving power from the first power supply for a period of time;
      ii. after the period of time, when the voltage at the second power supply is still below the reference voltage:
         A. performing a shut-down process;
         B. opening the switch to an open position to stop receiving power from the first power supply;
   c. when the voltage at the second power supply is above the reference voltage, maintaining the switch in the closed position for receiving power from the first power supply; and
wherein the power supplied by the first power supply is greater than the power supplied by the second power supply.

2. The method of claim 1, wherein the reference voltage is greater than or equal to an operating voltage of the device.

3. The method of claim 1, wherein the shut-down process includes at least one of, safely terminating any ongoing processes and controllably shutting down the device.

4. The method of claim 1, wherein the device is connected to the first power supply through a terminal block of the device; and
   wherein the terminal block is mounted on the device.

5. The method of claim 1, wherein the device is connected to the second power supply through a power connector of the device; and
   wherein the power connector is selected from a group consisting of: a Universal Serial Bus (USB) input port, a Direct Current (DC) input port, an Alternating Current (AC) input port, and a cigarette lighter receptacle.

6. The method of claim 1, wherein the first power supply is a main battery of an automobile.

7. The method of claim 1, wherein the voltage at the second power supply is compared against the reference voltage by using a comparator.

8. The method of claim 1, further comprising:
before step (b)(ii)(A), sending a message to a user for confirmation; and
performing steps (b)(ii)(A-B) after receiving the confirmation from the user.

9. The method of claim 8, wherein the message is selected from a group consisting of an email, an instant message, a short message service (SMS) message, a phone call, a message shown in a web page, and a popup message at a web page.

10. The method of claim 1, wherein the device is a wireless router.

11. A method for receiving power supply at a device, wherein the device is connected to a first power supply and a second power supply, comprising:
  a. receiving power from one or both of the first power supply and the second power supply;
  b. receiving a signal through an input in order to determine whether to close or to open a switch;
  c. when determined to close the switch:
    i. maintaining the switch in a closed position for receiving power from the first power supply for a period of time;
    ii. after the period of time, when the device is not receiving the power from the second power supply:
      A. performing a shut-down process;
      B. opening the switch to an open position to stop receiving power from the first power supply;
  d. when determined to open the switch:
    i. performing the shut-down process;
    ii. opening the switch to the open position to stop receiving power from the first power supply; and
wherein the power supplied by the first power supply is greater than the power supplied by the second power supply.

12. The method of claim 11, wherein the signal is received through an accessory (ACC) line of an automobile and the device is in the automobile.

13. A system for receiving power supply at a device,
wherein the device is connected to a first power supply and a second power supply,
wherein the system comprises:
  a first connector configured to connect to the first power supply;
  a second connector configured to connect to the second power supply;
  at least one processing unit;
  at least one storage medium storing program instructions executable by the at least one processing unit for:
    a. detecting reference voltage whether voltage at the second power supply is below a reference voltage;
    b. when the voltage at the second power supply is below the reference voltage:
      i. maintaining a switch in a closed position for receiving power from the first power supply for a period of time;
      ii. after the period of time, when the voltage at the second power supply is still below the reference voltage:
        A. performing a shut-down process;
        B. opening the switch to an open position to stop receiving power from the first power supply;
    c. when the voltage at the second power supply is above the reference voltage, maintaining the switch in a closed position for receiving power from the first power supply; and
  wherein the power supplied by the first power supply is greater than the power supplied by the second power supply.

14. The device of claim 13, wherein the reference voltage is greater than or equal to operating voltage of the device.

15. The device of claim 13, wherein the shut-down process includes at least one of, safely terminating any ongoing processes and controllably shutting down the device.

16. The device of claim 13, wherein the device is connected to the first power supply through a terminal block of the device; and
wherein the terminal block is mounted on the device.

17. The device of claim 13, wherein the device is connected to the second power supply through a power connector of the device; and
wherein the power connector is selected from a group consisting of: a Universal Serial Bus (USB) input port, a Direct Current (DC) input port, an Alternating Current (AC) input port, and a cigarette lighter receptacle.

18. The device of claim 13, wherein the first power supply is a main battery of an automobile.

19. The device of claim 13, wherein the voltage at the second power supply is compared against the reference voltage by using a comparator.

20. The device of claim 13, wherein the at least one storage medium further storing program instructions for:
before step (b)(ii)(A), sending a message to a user for confirmation; and
performing steps (b)(ii)(A-B) after receiving the confirmation from the user.

* * * * *